(12) United States Patent
Sheth et al.

(10) Patent No.: US 9,520,943 B2
(45) Date of Patent: Dec. 13, 2016

(54) COMMUNICATION OVER MULTIMODE AND SINGLE MODE FIBER

(71) Applicant: FINISAR CORPORATION, Sunnyvale, CA (US)

(72) Inventors: Samir Sheth, Sunnyvale, CA (US); Jonathan P. King, San Francisco, CA (US); T.H. Ola Sjolund, Morgan Hill, CA (US); Xiaojie Xu, Pleasanton, CA (US); Tengda Du, San Jose, CA (US); Steffen Koehler, San Carlos, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 36 days.

(21) Appl. No.: 14/644,019

(22) Filed: Mar. 10, 2015

(65) Prior Publication Data

US 2015/0256256 A1 Sep. 10, 2015

Related U.S. Application Data

(60) Provisional application No. 61/950,789, filed on Mar. 10, 2014, provisional application No. 62/065,568, filed on Oct. 17, 2014.

(51) Int. Cl.
*H04B 10/12* (2006.01)
*H04B 10/25* (2013.01)
(Continued)

(52) U.S. Cl.
CPC ......... *H04B 10/2504* (2013.01); *G02B 6/4296* (2013.01); *G02B 6/43* (2013.01);
(Continued)

(58) Field of Classification Search
CPC ............................ H04B 10/2504; H04B 10/27
See application file for complete search history.

(56) References Cited

U.S. PATENT DOCUMENTS

| 5,886,972 A * | 3/1999 | Jiang | G11B 7/00454 369/116 |
|---|---|---|---|
| 2005/0025500 A1* | 2/2005 | Hallemeier | H04B 10/2581 398/186 |

(Continued)

OTHER PUBLICATIONS

International Search Report and Written Opinion mailed Jun. 23, 2015 in related PCT Application No. PCT/US2015/019759, 12 pgs.

(Continued)

*Primary Examiner* — Dzung Tran
(74) *Attorney, Agent, or Firm* — Maschoff Brennan (57) ABSTRACT

An example embodiment includes a system for communicating an optical signal. The system includes an optical transmitter and an optical receiver. The optical transmitter includes one or more lasers configured to produce a light signal and a transmitter optical sub assembly (TOSA) receptacle. The TOSA receptacle optically couples the lasers to an optical fiber and launches a quasi-multimode optical signal (quasi-MM signal) that includes at least one lower order mode optical signal and at least one higher order mode optical signal onto the optical fiber. The optical receiver is connected to the optical fiber via a receiver optical sub assembly (ROSA) receptacle. The optical receiver is configured to receive the quasi-MM signal and to substantially block the at least one higher order mode optical signal.

20 Claims, 6 Drawing Sheets

(51) Int. Cl.
G02B 6/43 (2006.01)
G02B 6/42 (2006.01)
H04B 10/27 (2013.01)
H04B 10/2581 (2013.01)
H04J 14/04 (2006.01)

(52) U.S. Cl.
CPC ......... H04B 10/2581 (2013.01); H04B 10/27 (2013.01); H04J 14/04 (2013.01)

(56) References Cited

U.S. PATENT DOCUMENTS

| | | | | |
|---|---|---|---|---|
| 2006/0182388 | A1* | 8/2006 | Deliwala | H04B 10/2581 385/28 |
| 2007/0233906 | A1* | 10/2007 | Tatum | G06F 13/28 710/26 |
| 2008/0131051 | A1* | 6/2008 | Jenkins | G02B 6/4201 385/27 |

OTHER PUBLICATIONS

Rahul A. Panicker et al., "1010 Gb/s DWDM Transmission Through 2.2-km Multimode Fiber Using Adaptive Optics", IEEE Photonics Technology Letters, IEEE Service Center, Piscataway, NJ, vol. 19, No. 15, Aug. 1, 2007, 3 pgs.

Tamas Cseh et al., "Improved receiver techniques for Radio over Multimode fiber systems", Proceedings of the 2013 18th European Conference on Network and Optical Communications & 2013 8th Conference on Optical Cabling and Infrastructure (NOC-OC&I), IEEE, Jul. 10, 2013, pp. 23-26.

* cited by examiner

COMMUNICATION OVER MULTIMODE AND SINGLE MODE FIBER

RELATED APPLICATIONS

This application claims the benefit of and priority to U.S. Provisional Applications Nos. 62/065,568, filed Oct. 17, 2014, and 61/950,789, filed Mar. 10, 2014 which are incorporated herein by reference in their entireties.

FIELD

Embodiments described herein are directed to transceivers, communication systems, and methods for providing efficient and cost effective serial communication over a multimode fiber and single mode fiber.

BACKGROUND

Modal bandwidth in an optical communication system is related to dispersion of optical signals that may be caused by optical fiber. The dispersion of the optical signals may be related to mode delay that may occur as an optical signal propagates along the optical fiber and optical power of the optical signal. Generally, optical communication systems having a higher modal bandwidth are capable of communication of optical signals having higher bitrates over greater distances than those optical communication systems having a lower modal bandwidth.

Accordingly, a goal of optical communication system design includes increasing modal bandwidth. However, many of the mechanisms included in optical communication systems include high cost solutions. For example, optical communication systems may include an external patch cord and/or a modal filter. These mechanisms significantly increase the cost of the optical communication system.

The subject matter claimed herein is not limited to embodiments that solve any disadvantages or that operate only in environments such as those described above. Rather, this background is only provided to illustrate one example technology area where some embodiments described herein may be practiced.

SUMMARY OF SOME SAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

An example embodiment includes a system for communicating an optical signal. The system includes an optical transmitter and an optical receiver. The optical transmitter includes one or more lasers configured to produce a light signal and a transmitter optical sub assembly (TOSA) receptacle. The TOSA receptacle optically couples the lasers to an optical fiber and launches a quasi-multimode optical signal (quasi-MM signal) that includes at least one low order mode optical signal and at least one higher order mode optical signal onto the optical fiber. The optical receiver is connected to the optical fiber via a receiver optical sub assembly (ROSA) receptacle. The optical receiver is configured to receive the quasi-MM signal and to substantially block the at least one higher order mode optical signal.

Another example embodiment includes a communication module. The communication module includes one or more lasers, a multiplexer (MUX), and a TOSA receptacle. The one or more lasers are configured to produce light signals. The MUX is configured to receive the light signals and multiplex the light signals into wavelength division multiplex (WDM) optical signals. The TOSA receptacle launches at least a portion of the WDM optical signal to an optical fiber. The TOSA receptacle includes a receptacle length configured such that higher order modes of an optical signal received by the TOSA receptacle are not completely attenuated prior to being launched onto the optical fiber.

Another example embodiment includes a method of increasing modal bandwidth in a communications link. The method includes producing an optical signal. The method includes optically communicating the light signal to a TOSA receptacle. The method includes launching a quasi-MM signal from the TOSA receptacle to an optical fiber. The quasi-MM signal includes a low order mode optical signal and a higher order mode optical signal. The method includes receiving the quasi-MM signal at a ROSA receptacle of an optical receiver. The method includes substantially blocking the higher order mode optical signal of the quasi-MM optical signal.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Some embodiments described herein relate to transceivers, communication systems, and methods for providing efficient and cost effective serial communication over a multimode fiber (MMF) and single mode fiber (SMF).

The standard approach for transmission of high speed signals over MMF is to couple an optical transmitter into multiple spatial modes of the fiber. However, when the MMF is being used at a wavelength other than the wavelength for which modal bandwidth is optimized, a higher effective modal bandwidth can be achieved by coupling into substantially a single spatial mode of the fiber. However, conditioning the optical transmitter to couple to a single spatial mode involves a high cost filter or a relatively long fiber length. The relatively long fiber length may include a fiber stub that is positioned inside the optical transmitter package with a long (e.g., one or more centimeters) fiber length, or an external single mode fiber pigtail at one or both ends of the communication link. The pigtail(s) and the fiber stub with the relatively long fiber length are not compatible with small form factor, low cost transceivers.

In an example embodiment, a transmitter optical subassembly (TOSA) having an SMF fiber stub receptacle is used to launch a substantially single mode light signal into an MMF. The substantially single mode light signal includes a composite of core (fundamental) and cladding modes (higher order). The substantially single mode light signal is herein referred to as a quasi-multimode optical signal (quasi-MM signal). A receiver optical subassembly (ROSA) receives the quasi-MM signal. The higher order modes are substantially blocked, thereby increasing effective modal bandwidth.

In this and other embodiments, the higher order mode optical signals (e.g., the cladding modes) are allowed to propagate from the TOSA. The higher order mode optical signals (hereinafter, higher order mode or higher order modes) are substantially blocked during propagation, at the ROSA, at the receiving end of the communication link, or some combination thereof.

For example, a first approach uses an SMF fiber stub receptacle at a receiver. The SMF fiber stub is implemented so as to reject the higher order modes that are allowed to propagate along the MMF. A second approach utilizes an MMF fiber stub receptacle in conjunction with a narrow-active region photodetector at a receiver. Again, the MMF fiber stub receptacle and the photodetector are implemented so as to filter out the higher order modes. In embodiments using the second approach, imaging optics (e.g., a lens) within the receiver may ensure that higher order modes fall outside the active region of the photodetector. For instance, a diameter of the active region may be smaller than the image of the MMF core produced by the imaging optics at a photodetector surface. Each approach increases the effective modal bandwidth without incurring an excess cost (e.g., as associated with external patch cords) and/or while maintaining physical restrictions associated with small form, pluggable communication modules.

Some embodiments may be included in communication links providing serial communications over an MMF. In an example of such embodiments, four light signals from lasers (e.g., distributed feedback (DFB) lasers or vertical-cavity surface-emitting lasers (VCSELs)) are provided. The light signals are multiplexed via an appropriate multiplexor, and then transmitted to the MMF, such as OM3/OM4 category fiber via a low-cost, SMF fiber-stub receptacle. The SMF fiber stub receptacle allows a composite of lower order mode optical signals (e.g., core) and higher order modes (e.g., cladding modes) to propagate to the MMF. Thus, the signal transmitted via the MMF can be considered the quasi-MM signal. The quasi-MM signal travels down the length of the MMF to a receiver. The higher order modes are then filtered at the receiver. For example, an SMF fiber stub receptacle is included at the receiver to filter out the higher order modes. Alternatively, an MMF fiber stub receptacle in conjunction with a narrow active region photodetector. Either approach allows for the higher order modes to be cost effectively rejected at the receiver without a significant change to the overall design.

In another embodiment, one or more of the foregoing techniques might be used to provide a so-called "dual mode" module. A dual mode module is a module that is able to transmit over SMF or MMF. The system includes the components described above. When operating over the SMF, the higher order modes are rejected and only one mode (e.g., the fundamental) travels down the SMF. A MMF fiber stub receptacle or the SMF fiber stub at the receiver may have a minimal impact on the SMF signal as the lengths are relatively short compared to the SMF. As such, SMF performance is optimized, and is similar to currently available long reach modules. In this embodiment, the dual mode module can thus be used for both SMF and MMF.

These and other embodiments are described herein with reference to the appended drawings. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

Figure 1:
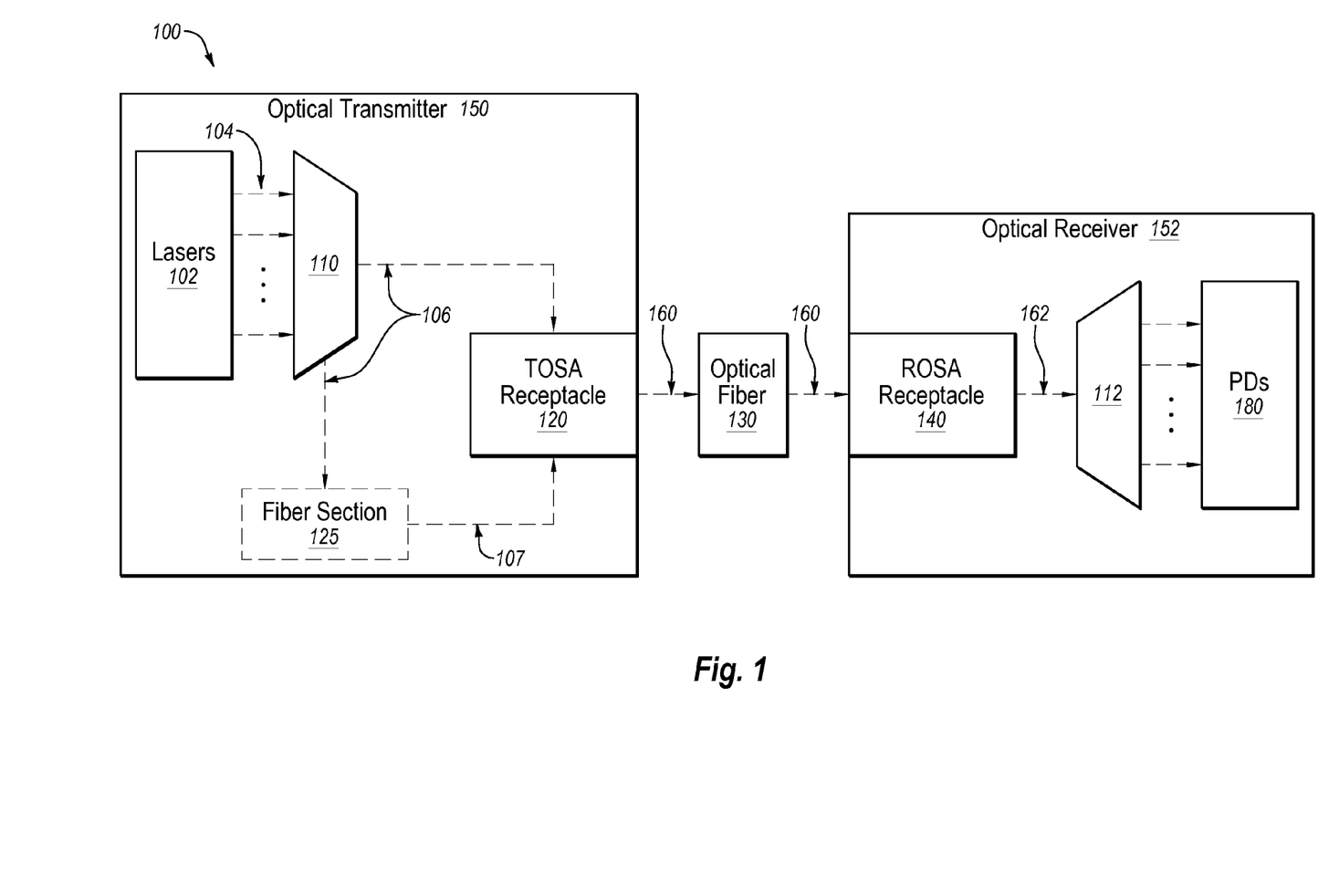
FIG. 1 illustrates an example system for optical communication.

FIG. 1 illustrates a block diagram of an example system 100 for communicating an optical signal between an optical transmitter 150 and an optical receiver 152 along an optical fiber 130 that may be included in an optical link. The system 100 is configured to provide an effective modal bandwidth of data communicated in the system 100. In particular, the system 100 is configured to increase the effective modal bandwidth through use of a TOSA receptacle 120 at the optical transmitter 150 and/or a ROSA receptacle 140 at the optical receiver 152. The effective modal bandwidth is increased without using a modal filter or external patch cords at the optical transmitter 150 and/or the optical receiver 152. By omitting the external patch cord(s) and the modal filters, the system 100 reduces part counts as well as costs and complexity associated therewith.

The system 100 includes a communications link that may provide serial communications over the optical fiber 130. The system 100 is a wavelength division multiplex (WDM) system. Accordingly, in the system 100, the optical transmitter 150 includes two or more lasers 102. One or more of the lasers 102 are configured to produce a light signal having a particular wavelength, which may be referred to as a channel. The light signals are generally represented by arrows 104 in FIG. 1.

In the depicted embodiment, the lasers 102 may include DFB lasers or VCSELs and the light signals may be generated at about 10 gigabits per second (Gbps). In other embodiments, the system 100 may include other types of light signal sources. For example, embodiments may include light emitting diodes, Fabry-Perot lasers, or another light signal source.

The light signals 104 are communicated to a multiplexer (MUX) 110. The MUX 110 is configured to multiplex the light signals 104 into a WDM optical signal. The WDM optical signal is generally represented by arrow 106 in FIG. 1 as well as in other Figures of this application.

In some embodiments, the MUX 110 may include a coarse WDM MUX (CWDM MUX). For example, in these embodiments, the system 100 may include four lasers 102 producing light signals 104 having wavelengths separated by about twenty nanometers (nm). Additionally, in embodiments implementing the CWDM MUX, the optical transmitter 150 may be substantially compliant with QSFP+MSA or another similar form factor.

In the depicted embodiments, two physical configurations are illustrated. In a first physical configuration, the WDM optical signal 106 may be communicated to the TOSA receptacle 120. The TOSA receptacle 120 optically couples, at least indirectly, the lasers 102 to the optical fiber 130. The TOSA receptacle 120 is configured to launch an optical signal onto the optical fiber 130. The optical signal launched by the TOSA receptacle 120 is represented in FIG. 1 by arrow 160.

Generally, the optical signal 160 that is launched by the TOSA receptacle 120 includes at least a portion of the WDM optical signal 106. Generally, when launched or introduced onto an optical fiber (e.g., the optical fiber 130), the WDM optical signal 106, or another optical signal, may include one or more lower order mode optical signals (e.g., a fundamental mode or a core mode). The lower order mode optical signals (hereinafter, lower order mode or lower order modes) are communicated in a core of the optical fiber 130. In addition, the optical signal may include one or more higher order modes (e.g., cladding modes). If detected at the optical receiver 152, the higher order modes may detract from a signal quality of data communicated in the system 100. In the system 100 the higher order modes of the optical signal 160 may be substantially blocked or attenuated prior to detection at the optical receiver 152.

The TOSA receptacle 120 is configured to not completely attenuate the higher order modes of the WDM optical signal 106. Use of completely attenuate or variations thereof regarding the TOSA receptacle 120 indicate that there may be some attenuation that occurs in the TOSA receptacle 120. However, the amount of such attenuation is not significant in creation of a single spatial mode for propagation along the optical fiber 130.

For example, the TOSA receptacle 120 may include a receptacle length configured such that higher order modes of an optical signal (e.g., the WDM optical signal 106 or the output optical signal 107 discussed below) received by the TOSA receptacle 120 are not completely attenuated prior to being launched onto the optical fiber 130. Again, not attenuating the higher order modes by the TOSA receptacle 120 may result in the higher order modes being included in the optical signal 160. Accordingly, in some embodiments, the optical signal 160 may be referred to as a quasi-MM signal. The quasi-MM signal may be substantially a single mode signal with higher order modes. Thus, the quasi-MM signal includes a composite of at least one low order mode optical signal and at least one higher order mode optical signal. Some additional details of this first physical configuration are provided in FIG. 2.

In a second configuration depicted in FIG. 1, a fiber section 125 is included in the optical transmitter 150. The fiber section 125 may be positioned between the MUX 110 and the TOSA receptacle 120. The fiber section 125 is configured to receive the WDM optical signal 106 from the MUX 110. The fiber section 125 substantially attenuates the higher order modes and communicates an output optical signal 107 substantially including lower order modes to the TOSA receptacle 120.

The output optical signal 107 may be received at the TOSA receptacle 120. Because few higher order modes are included in the output optical signal 107, the TOSA receptacle 120 may minimally affect the output optical signal 107 prior to launching it onto the optical fiber 130. In this configuration, the optical signal 160 launched onto the optical fiber 130 may include few if any higher order modes (e.g., similar to output optical signal 107) as the TOSA receptacle 120 is not configured to substantially attenuate the higher order modes. Some additional details of this second physical configuration are provided in FIG. 3.

The optical fiber 130 may include an SMF or an MMF. In embodiments in which the optical signal 160 does not include or includes fewer higher order modes, the type (e.g., SMF or MMF) may not affect operation of the system 100. In embodiments, in which the optical signal 160 includes higher order modes, the type of optical fiber 130 may affect modal bandwidth of the system 100.

For example, in embodiments in which the optical fiber 130 includes an SMF, the optical fiber 160 exiting the optical fiber 130 may not include or may include fewer higher order modes. In these and other embodiments, the optical receiver 152 may include a standard WDM-type optical receiver. For example, the optical receiver 152 may omit the ROSA receptacle 140 and simply include a demultiplexer (DEMUX) 112 and one or more photodetectors (PDs) 180.

Alternatively, in embodiments in which the optical fiber 130 includes an MMF, the optical signal 160 exiting the optical fiber 130 may include higher order modes. In these and other embodiments, the optical receiver 152 or some component(s) therein may be configured to substantially block the higher order modes. For example, the optical receiver 152 may include a ROSA receptacle 140 that substantially blocks the higher order modes prior to communication to the PDs 180. The ROSA receptacle 140 may be an SMF fiber stub that blocks the higher order modes and outputs an optical signal, denoted at 162, that includes few or no higher order modes. The optical signal 162 is communicated to the DEMUX 112 where it is separated and communicated to the PDs 180. Some additional details of this embodiment are described with reference to FIG. 5.

In other embodiments, the PDs 180 may include active regions that are small relative to an exit of the ROSA receptacle 140. An image of the exit of the ROSA receptacle 140 may be produced on the active region. Because the image is larger than the active region, portions of the optical signal 162 that include the higher order modes may not be detected by the PDs 180. Some additional details of this embodiment are described with reference to FIG. 4.

Additionally, in some embodiments, a fiber segment may be positioned between the DEMUX 112 and the PDs 180. The fiber segment may include a core diameter that is less than a core diameter of the ROSA receptacle 140. The fiber segment may block the portions of the optical signal 162 that may include the higher order modes such that the higher order modes are not detected by the PDs 180.

Modifications, additions, or omissions may be made to the system 100 without departing from the scope of the present disclosure. Specifically, the present disclosure may apply to any optical communication system and are not limited to WDM systems. Moreover, the present disclosure may apply to optical communication systems that may include multiple WDM communication links, dense DWDM systems, and the like.

Furthermore, the separation of various components in the embodiments described herein is not meant to indicate that the separation occurs in all embodiments. It may be understood with the benefit of this disclosure that the described components may be integrated together in a single component or separated into multiple components.

Figure 2:
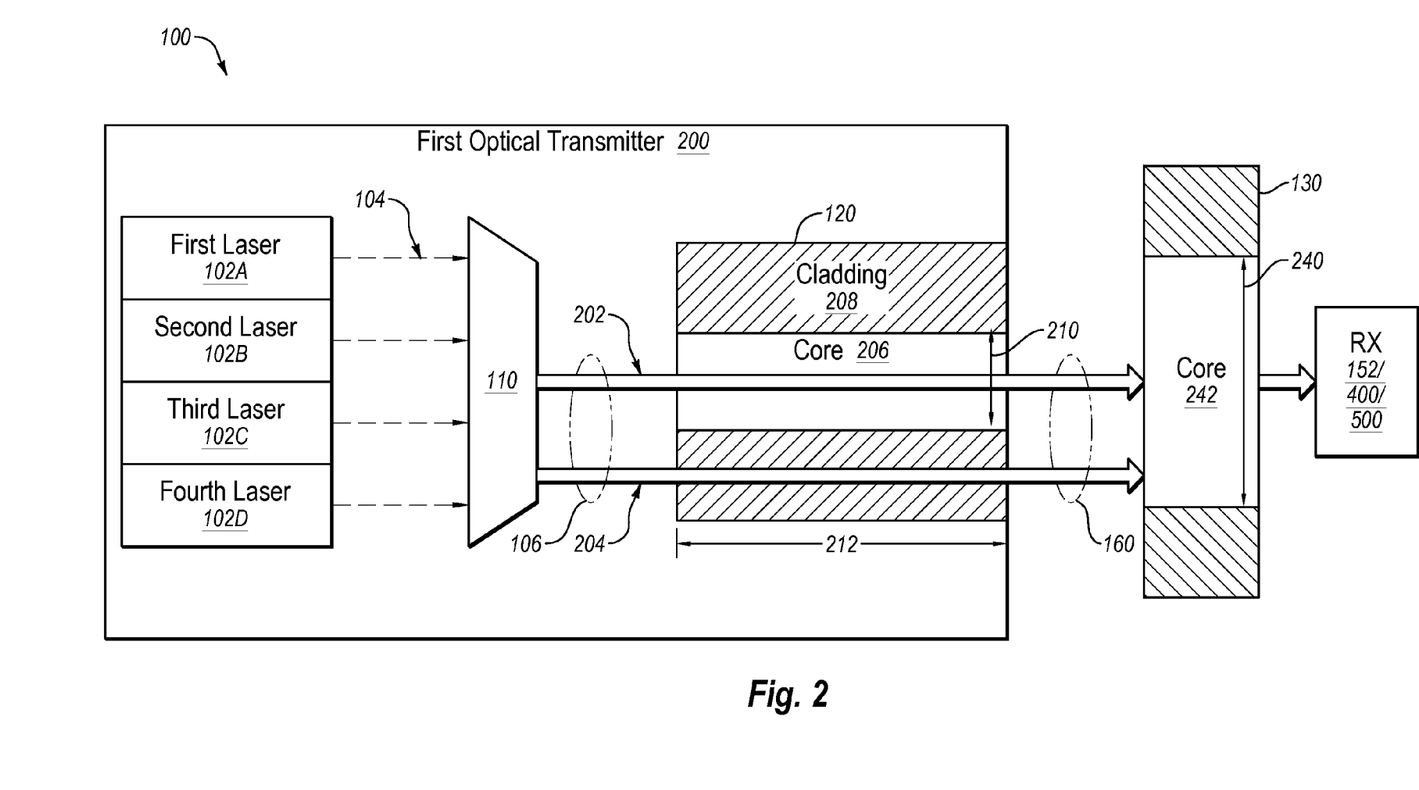
FIG. 2 illustrates an example optical transceiver that may be implemented in the system of FIG. 1.

FIG. 2 illustrates a block diagram of an example first optical transmitter 200. The first optical transmitter 200 is depicted in the system 100 of FIG. 1. In the depicted embodiment, the first optical transmitter 200 is an embodiment of the optical transmitter 150 discussed with reference to FIG. 1. Some embodiments of the first optical transmitter 200 may be implemented in other optical systems or communication links. Moreover, in some embodiments, the first optical transceiver 200 and/or one or more other components thereof may include or be included in a communication module. The communication module may be pluggable in some implementations. The communication module may support dual mode applications (e.g., implementation with MMF and SMF) as discussed elsewhere herein. In these and other embodiments, the communication module may substantially comply with one or more standards such as QSFP+, QSFP, SFP, or another communication module standard.

In the depicted embodiment, the first optical transmitter 200 is implemented with one or more of optical receivers 152, 400, and 500 discussed herein (in FIG. 2, "RX 152/400/500"). Some additional details of a first optical receiver 400 are provided with reference to FIG. 4 and some additional details of a second optical receiver 500 are provided with reference to FIG. 5. Additionally or alternatively, the first optical transmitter 200 may be implemented with another optical receiver.

The first optical transmitter 200 includes four lasers 102A-102D (generally, laser 102 or lasers 102). The lasers 102 substantially correspond to the lasers 102 of FIG. 1. As described above, the lasers 102 may include one or more DFB lasers or one or more VCSELs, for instance. The lasers 102 may generate the light signals 104 at 10 Gbps in some embodiments. In other embodiments, the lasers 102 may include other optical sources and may operate at other bit rates.

The lasers 102 are configured to produce the light signals 104, which are received by and multiplexed by the MUX 110. As discussed with reference to FIG. 1, the MUX 110 may include a CWDM MUX or another type of MUX based on wavelength spacing of the light signals 104 and/or amplification selection in the system 100, for instance.

The MUX 110 may output the WDM optical signal 106, which may be introduced to the TOSA receptacle 120.

The TOSA receptacle 120 may include an SMF fiber stub receptacle. Generally, an SMF fiber stub receptacle may include a section of SMF and an optical coupling to the optical fiber 130. The TOSA receptacle 120 includes a receptacle length 212 and a core diameter 210. The receptacle length 212 may be defined between the MUX 110 and the optical fiber 130 and the core diameter 210 may be defined across a core 206.

Although not explicitly depicted in FIG. 2, the MUX 110 may be directly optically coupled to the TOSA receptacle 120. For example, the MUX 110 may be coupled to the core 206 and to the cladding 208 of the TOSA receptacle 120. Accordingly, one or more lower order modes 202 may travel down the core 206 to the optical fiber 130. In addition, one or more higher order modes 204 of the WDM optical signal 106 may be introduced into the cladding 208 of the TOSA receptacle 120. The higher order modes 204 may be attenuated in the cladding 208, but are still launched into the optical fiber 130 because of the receptacle length 212, which may be configured to be too short for significant attenuation.

In particular, when the optical fiber 130 includes an MMF, a core diameter 240 of the optical fiber 130 may be greater than the core diameter 210 of the TOSA receptacle 120. For instance, the core diameter 210 may be about 9 μm and the core diameter 240 may be about 50 μm. Thus, the higher order modes may be launched to a core 242 of the optical fiber 130. Therefore, the optical signal 160 may be a composite signal including the lower order modes 202 and the higher order modes 204. The optical signal 160 may propagate along the optical fiber 130 to the optical receivers 152/400/500 or another optical receiver. The higher order modes 204 may not be attenuated at all or as much as in embodiments implementing the SMF. Instead, the higher order modes 204 may be substantially blocked at the optical receivers 152/400/500. After the higher order modes 204 are blocked at the optical receiver 152/400/500, the signal quality of the optical signal 160 may not be substantially affected by the higher order modes 204.

In some embodiments, the optical fiber 130 may include an SMF, which may include a smaller core diameter 240. The TOSA receptacle 120 launches the optical signal 160 including the at least one higher order mode 204 onto the SMF. However, the higher order modes 204 may be blocked or attenuated by the optical fiber 130. For example, the optical fiber 130 may at least partially attenuate the higher order modes 204 as the optical signal 160 propagates along the optical fiber 130. When the optical signal 160 is received at the optical receiver 152/400/500 or another optical receiver, the optical signal 160 may include only the lower order modes 202. Thus, the signal quality of the optical signal 160 may not be substantially affected by the higher order modes 204. In some embodiments, the core diameter 210 of the TOSA receptacle 120 may be greater than the core diameter 242 of the optical fiber 130. The ability to launch the optical signal 160 onto the SMF and to the MMF may contribute to the first optical transmitter 200 being categorized as "dual mode."

The receptacle length 212 and/or the core diameter 210 may be configured such that higher order modes 204 of an optical signal received by the TOSA receptacle 120 are not completely attenuated prior to being launched onto the optical fiber 130. For instance, in the depicted embodiment, the WDM optical signal 106 is received by the TOSA receptacle 120. The higher order modes 204 are not completely attenuated by the TOSA receptacle 120. Thus, the optical signal 160 includes the higher order modes 204.

By lowering and/or minimizing the receptacle length 212, the higher order modes 204 may be launched to the optical fiber 130. However, through one or more processes of substantially blocking such higher order modes 204 the signal quality of the optical signal 160 may be substantially unaffected. Moreover, the lowering and/or the minimizing of the receptacle length 212 may enable use of the less expensive TOSA receptacle 120. In particular, in comparison to systems implementing conventional attenuation means such as modal filters and patch cords, use of the TOSA receptacle 120 provides significant cost savings.

In some embodiments, the optical signal received by the TOSA receptacle 120 may not be communicated directly from the MUX 110. For example, a second optical transmitter 300 of FIG. 3 includes an embodiment in which the optical signal received by the TOSA receptacle 120 may not be directly communicated by the MUX 110. In these embodiments, the TOSA receptacle 120 may be similarly configured to not completely attenuate higher order modes. Some additional details of the second optical transmitter 300 are discussed below with reference to FIG. 3.

Through selection and/or configuration of the receptacle length 212 and/or the core diameter 210, the lower order modes 202 of the optical signal 160 and the higher order modes 204 of the optical signal 160 that are launched onto the optical fiber 130 may be determined. Moreover, the lower order modes 202 of the optical signal 160 and the higher order modes 204 may be controlled by the receptacle length 212 and/or the core diameter 210. Thus, the modal composition of the optical signal 160 may be customized for a particular implementation.

For example, in implementations in which higher power is desired over bandwidth, the TOSA receptacle 120 can be implemented to propagate higher order modes 204 to increase optical power and signal-to-noise ratio. To do so, the core diameter 210 may be increased, for example beyond a dimension (e.g., 9 µm) of an SMF to allow increase in the number of modes propagated. Similarly, the receptacle length 212 may be increased to increase cladding mode attenuation. In this manner, the transmitted power and number of modes propagated may be reduced and/or controlled.

Figure 3:
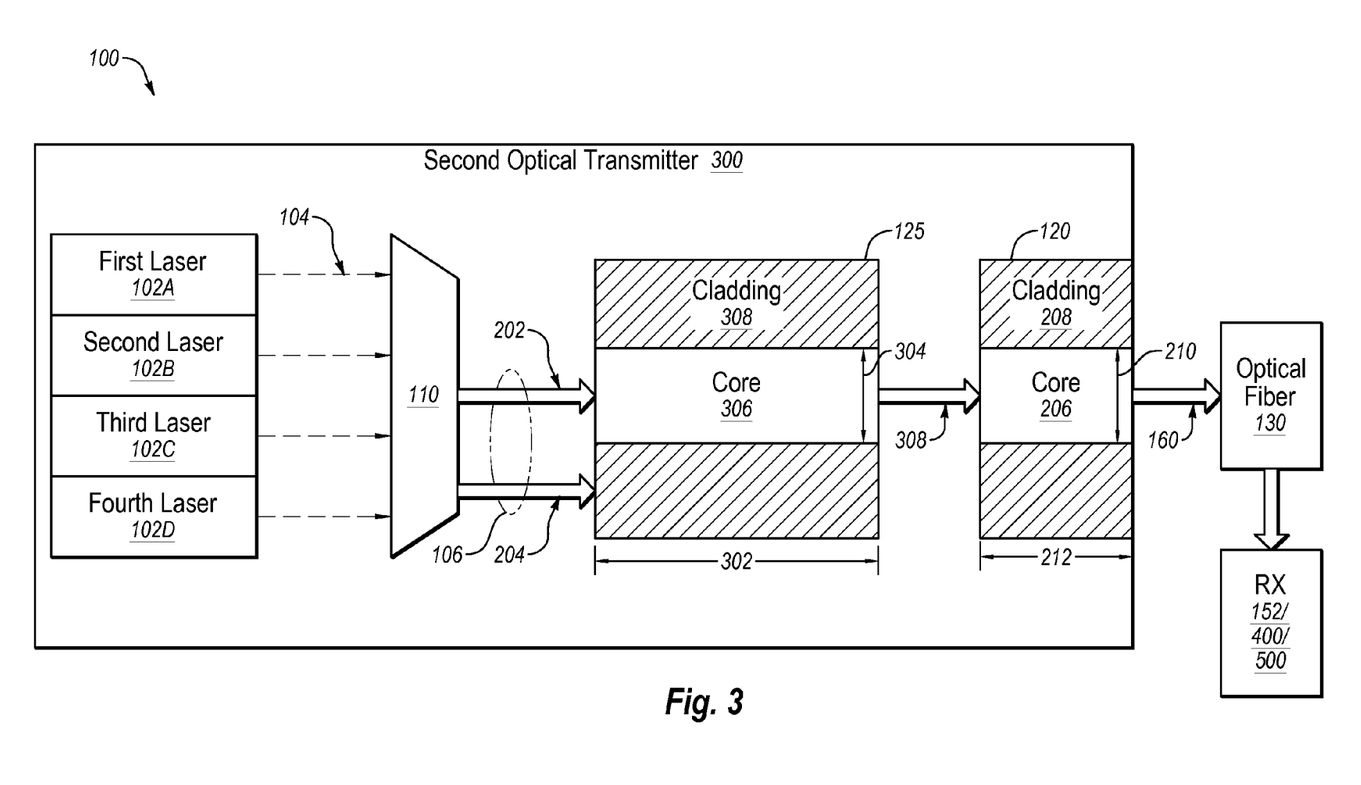
FIG. 3 illustrates another example optical transceiver that may be implemented in the system of FIG. 1.

FIG. 3 illustrates a block diagram of an example second optical transmitter 300. The second optical transmitter 300 may be similar to the first optical transmitter 200 described with reference to FIG. 2. For example, the second optical transmitter 300 is depicted in the system 100 of FIG. 1 and may be an example embodiment of the optical transmitter 150 discussed with reference to FIG. 1. Some embodiments of the second optical transmitter 300 may be implemented in other optical systems, communication links, or as a communication module (e.g., QSFP+, QSFP, or SFP compliant communication module).

The second optical transmitter 300 may be implemented with one or more of optical receivers 152, 400, and 500 discussed herein (in FIG. 3, "RX 152/400/500"). Additionally or alternatively, the second optical transmitter 300 may be implemented with an optical receiver that is not configured to block higher order modes.

The second optical transmitter 300 includes the four lasers 102 configured to produce light signals 104, which are received by and multiplexed by the MUX 110 as discussed with reference to FIGS. 1 and 2.

In the depicted embodiment, the MUX 110 is optically coupled to a fiber section 125. The fiber section 125 includes a section of SMF that is positioned between the MUX 110 and the TOSA receptacle 120. The fiber section 125 is configured to receive the WDM optical signal 106 from the MUX 110. As the WDM optical signal 106 propagates through the fiber section 125, the higher order modes 204 may be substantially attenuated. The fiber section 125 may output an output optical signal 308. The output optical signal 308 may substantially correspond to the output optical signal 107 of FIG. 1. The output optical signal 308 may include only the lower order modes 202 or an optical signal with the higher order modes 204 substantially attenuated. The output optical signal 308 may be communicated from the fiber section 125 to the TOSA receptacle 120.

The fiber section 125 may include a core diameter 304 and a section length 302. The core diameter 304 may be defined across a core 306. The section length 302 may be defined between the MUX 110 and the TOSA receptacle 120. The section length 302 and the core diameter 304 may be defined such that the higher order modes 204 are substantially attenuated in cladding 308 of the fiber section 125 prior to communication to the TOSA receptacle 120.

The TOSA receptacle 120 may be substantially similar to that discussed with reference to FIG. 2. In the second optical transmitter 300, the output optical signal 308 is received by the TOSA receptacle 120. The TOSA receptacle 120 may launch the output optical signal 308 with minimal or no further attenuation of higher order modes.

For example, as discussed above, the receptacle length 212 of the TOSA receptacle 120 may be configured such that higher order modes 204 of an optical signal received by the TOSA receptacle 120 (here the output optical signal 308) are not completely attenuated prior to being launched onto the optical fiber 130. Thus, the optical signal 160 that is launched to the optical fiber 130 may include the output optical signal 308.

Figure 4:
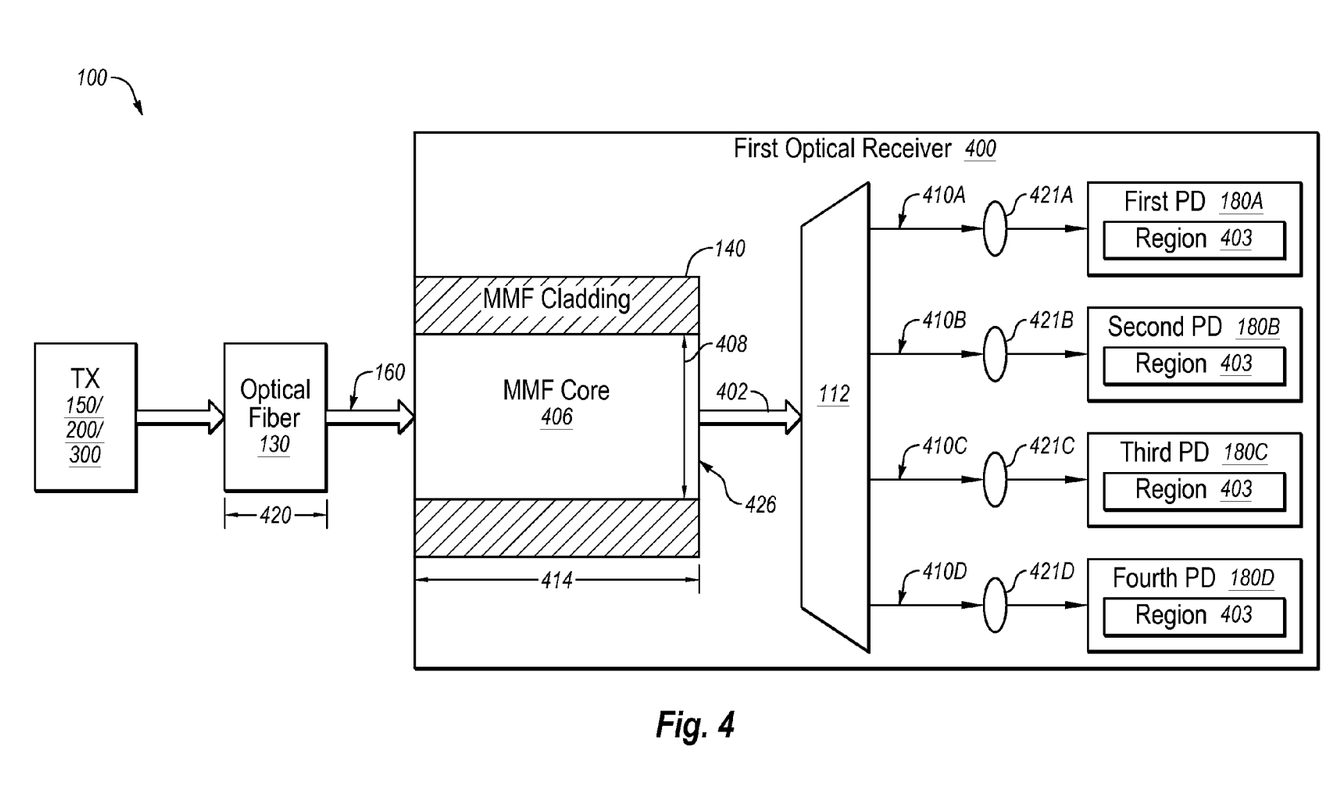
FIG. 4 illustrates an example optical receiver that may be implemented in the system of FIG. 1.

FIG. 4 illustrates a block diagram of a first optical receiver 400. The first optical receiver 400 is depicted in the system 100 of FIG. 1. For example, the first optical receiver 400 may be implemented as and/or may correspond to the optical receiver 152 of FIG. 1. Additionally, the first optical receiver 400 of FIG. 4 may be implemented with the optical transmitter 150 of FIG. 1, the first optical transmitter 200 of FIG. 2, or with the second optical transmitter 300 of FIG. 3 (in FIG. 4, TX 150/200/300). Implementation of the first optical receiver 400 may affect modal bandwidth of the optical signal 160 received by the first optical receiver 400.

In the embodiment depicted in FIG. 4, the optical signal 160 may be received at the ROSA receptacle 140. The optical signal 160 may include the quasi-MM signal as discussed above. Generally, if the optical signal 160 received at the first optical receiver 400 includes the higher order modes 204, then the optical fiber 130 is likely an MMF. The optical fiber 130 is likely the MMF because the MMF may allow propagation of the higher order modes 204, while an SMF may attenuate the higher order modes 204 during propagation from the optical transmitter 150/200/300. Nevertheless, in some implementations, the optical fiber 130 in FIG. 4 may include an SMF.

In the first optical receiver 400, the ROSA receptacle 140 may be configured to receive the optical signal 160. For example, although not depicted in FIG. 4, the ROSA receptacle 140 may be optically coupled to the optical fiber 130. The ROSA receptacle 140 may include an MMF fiber stub receptacle. A core diameter 408 of the MMF fiber stub receptacle may be sufficiently large for a majority of the lower order modes (e.g., 202 of FIG. 2) and the higher order modes (e.g., 204 of FIG. 2) of the optical signal 160 to propagate through the ROSA receptacle 140.

An exit optical signal 402 may be communicated to the DEMUX 112. The exit optical signal 402 may include the lower order modes and higher order modes. The DEMUX 112 may then separate the exit optical signal 402 into four light signals each having a particular wavelength, which may be referred to as a channel. The four light signals are represented by arrows 410A-410D. Because the higher order modes are not attenuated by the ROSA receptacle 140, each of the light signals 410A-410D include lower order modes and higher order modes corresponding to the particular wavelengths.

The light signals 410A-410D are communicated from the DEMUX 112 to one or more imaging optics 421A-421D (generally, imaging optics 421). The imaging optics 421 may be configured to produce an image of an exit 426 of the ROSA receptacle 140 on a photodetector surface of the PDs 180. The imaging optics 421A-421D may include a lens, for example.

In particular, the image of the exit 426 of the ROSA receptacle 140 may be produced on active regions 403 (in FIG. 4, "region 403") of the PDs 180. The image of the exit 426 of the ROSA receptacle 140 may have an area that is larger than an area of the active region 403 (e.g., the area of the active region 403 may be small relative to the area of the image). Accordingly, a portion of the image, the portion falling outside the area of the active region, may not be detected by the PDs 180.

The portion of the image not received by the active region 403 of the PDs 180 may include the higher order modes of the optical signal 160. Thus, the higher order modes do not excite the active region 403, and the PDs 180 are detecting, for the most part, to the lower order modes.

For example, a first light signal 410A may include higher order modes and lower order modes. The first light signal 410A may propagate through a first image optic 421A to produce an image of the exit 426 on the active region 403 of a first PD 180A. The active region 403 of the first PD 180A may be substantially circular and may include a diameter of about 30 micrometers (μm). The image produced on the active region 403 may also be substantially circular. The diameter of the image may be about 50 μm. Accordingly, an outer ring of the image does not fall on the active region 403 and may not be detected by the first PD 180A. The ring may include one or more of the higher order modes.

An MMF fiber length 414 and/or the MMF core 406 may be defined or selected such that the higher order modes of the optical signal 160 are blocked. For example, the MMF fiber length 414 and/or the MMF core 406 may be defined for a particular optical transmitter 150/200/300, a particular optical fiber length 420, a particular optical fiber 130 (e.g., OM3 or OM4), some other design criteria, or some combination thereof. For example, the number and/or optical power of the higher order modes included in the optical signal 160 may be known for the optical transmitter 150. Accordingly, MMF fiber length 414 and/or the MMF core 406 of the ROSA receptacle 140 may be defined to attenuate the number and/or optical power of the higher order modes.

Figure 5:
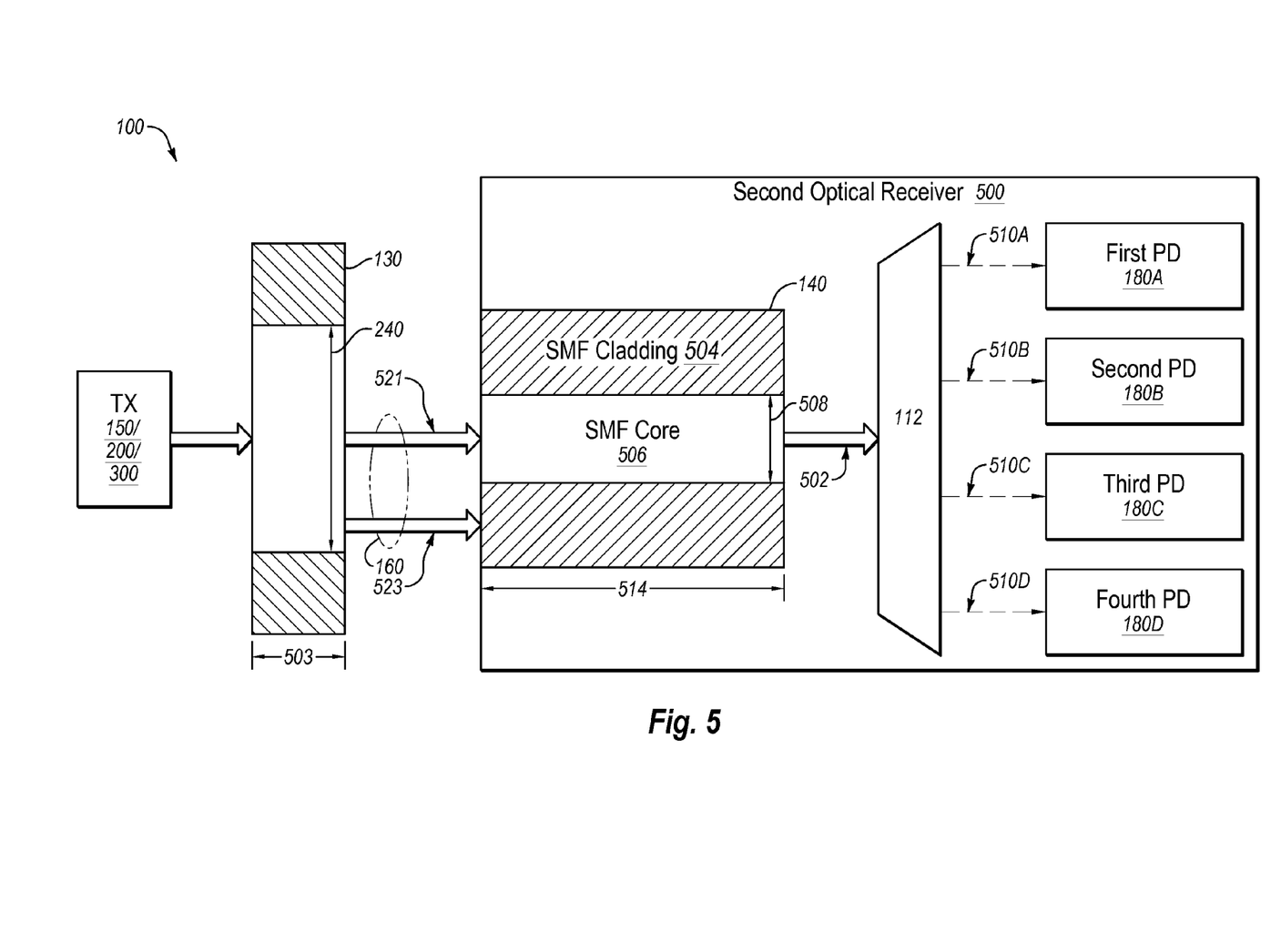
FIG. 5 illustrates another example optical receiver that may be implemented in the system of FIG. 1.

FIG. 5 illustrates a block diagram of a second optical receiver 500. The second optical receiver 500 is depicted implemented in the system 100 of FIG. 1. The second optical receiver 500 may be implemented as and may correspond to the optical receiver 152 of FIG. 1. Additionally, the second optical receiver 500 of FIG. 5 may be implemented with the optical transmitter 150 of FIG. 1, the first optical transmitter 200 of FIG. 2, or with the second optical transmitter 300 of FIG. 3 (in FIG. 5, TX 150/200/300). Implementation of the second optical receiver 500 may affect modal bandwidth of the optical signal 160 received by the second optical receiver 500.

In the embodiment depicted in FIG. 5, the optical signal 160 may be received at the ROSA receptacle 140. The optical signal 160 may include the quasi-MM signal, as discussed herein that includes lower order modes 521 and higher order modes 523.

In FIG. 5, the optical fiber 130 is depicted as an MMF. As discussed above with reference to FIG. 4, if the optical signal 160 received at the second optical receiver 500 includes the higher order modes 523, then the optical fiber 130 is likely an MMF. Nevertheless, in some implementations, the optical fiber 130 in FIG. 5 may include an SMF.

In the second optical receiver 500, the ROSA receptacle 140 may be configured to attenuate the higher order modes 523 prior to reception by the PDs 180. For example, the ROSA receptacle 140 may include an SMF fiber stub receptacle that includes a core diameter 508 smaller than the core diameter 240 of the optical fiber 130. Accordingly, the higher order modes 523 may be introduced to the SMF stub cladding 504, which may attenuate the higher order modes 523. Additionally, the ROSA receptacle 140 may include an SMF fiber stub length 514 that may be defined between the optical fiber 130 and the DEMUX 112. The SMF fiber stub length 514 and/or an SMF stub core 506 may be sized to ensure the higher order modes 523 are attenuated while lower order modes 521 are propagated through the ROSA receptacle 140.

An exit optical signal 502 may be communicated to the DEMUX 112. The exit optical signal 502 may include the lower order modes 521. The DEMUX 112 may then separate the exit optical signal 502 into four light signals each having a particular wavelength. The four light signals are represented by arrows 510A-510D. Because the higher order modes 523 are attenuated by the ROSA receptacle 140, the light signals 510A-510D include the lower order modes 521 corresponding to the particular wavelengths. The light signals 510A-510D are communicated from the DEMUX 112 to the PDs 180.

The SMF fiber stub length 514 and/or the core diameter 508 may be defined for a particular optical transmitter 150/200/300, a particular optical fiber length 503, a particular optical fiber 130 (e.g., OM3 or OM4), some other design criteria, or some combination thereof. For example, the number and/or optical power of the higher order modes 523 included in the optical signal 160 may be known for the optical transmitter 150. Accordingly, the SMF fiber stub length 514 and/or the core diameter 508 of the ROSA receptacle 140 may be defined to attenuate the number and/or optical power of the higher order modes 523.

As depicted in FIGS. 1-5, the various components are separated from one another. It may be understood with the benefit of this description, that this separation is not representative of physical embodiments. Instead, the components may be directly and/or optically coupled.

Figure 6:
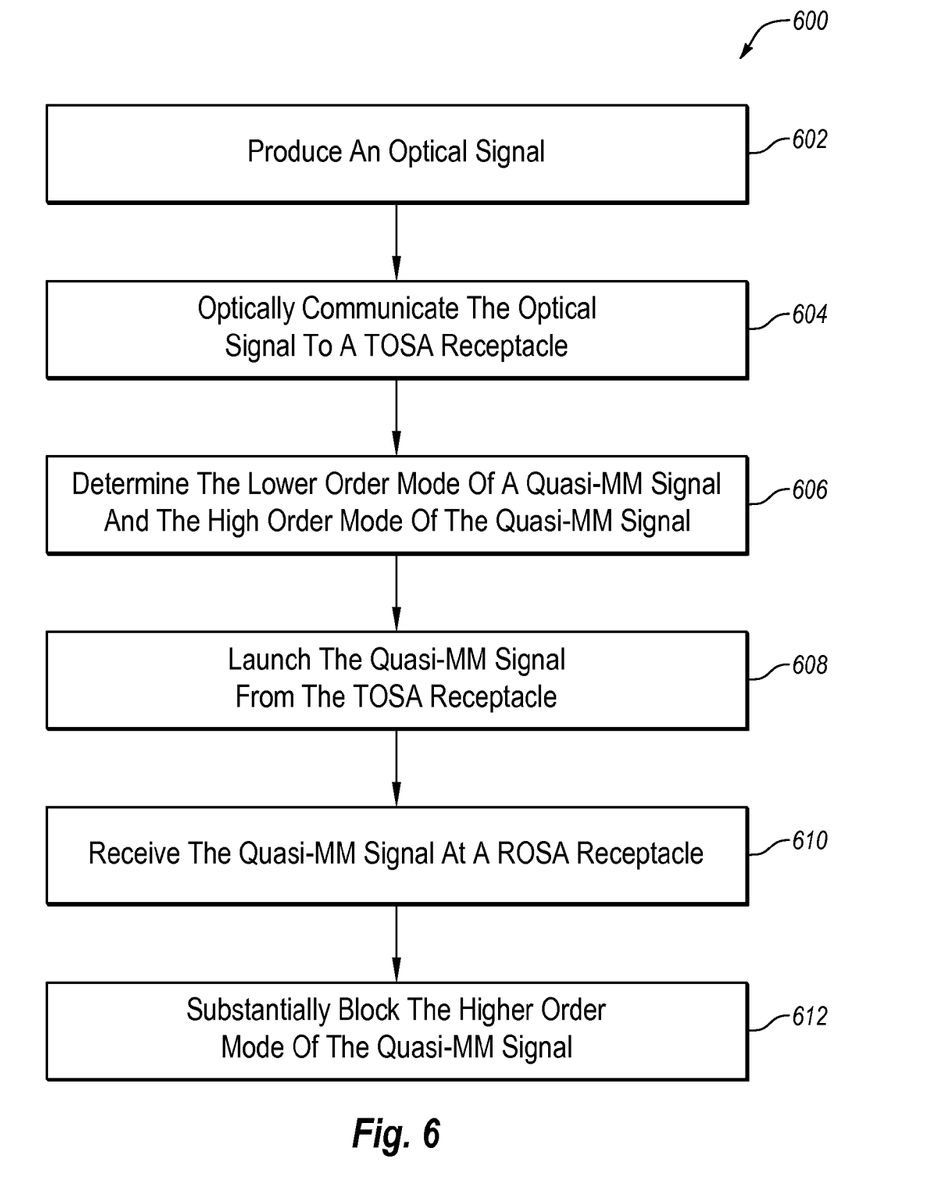
FIG. 6 is a flow chart of an example method of increasing modal bandwidth, all according to at least one embodiment described herein.

FIG. 6 is a flow chart of an example method 600 of increasing modal bandwidth, arranged in accordance with at least one embodiment described herein. The method 600 may be performed, for example, in the system 100 of FIG. 1. Additionally or alternatively, the method 600 or some portion thereof may be performed by one or more of the first optical transmitter 200 of FIG. 2, the second optical transmitter 300 of FIG. 3, the first optical receiver 400 of FIG. 4, the second optical receiver 500 of FIG. 5, or some combination thereof. Although illustrated as discrete blocks, various blocks may be divided into additional blocks, combined into fewer blocks, or eliminated, depending on the desired implementation.

The method 600 may begin at block 602, in which an optical signal is produced. The optical signal may be produced by lasers such as DFB lasers or VCSELs. The optical signal may include a WDM optical signal that is produced by multiplexing one or more channels that are each produced by one of the lasers. For example, the optical signal may include a multiplexed optical signal that includes four channels, one or more of which may be generated at about 10 Gbps.

At block 604, the optical signal may be optically communicated to a TOSA receptacle. In some embodiments, the optical signal may be communicated via a MUX and/or a fiber section. For example, in embodiments in which the optical signal includes a WDM optical signal, the optical signal may be communicated to the TOSA receptacle via the MUX. In some embodiments in which the optical signal is communicated via the MUX, the MUX may be directly, optically coupled to the TOSA receptacle and in particular to a core and a cladding of the TOSA receptacle. In some embodiments, the fiber section may be coupled between the TOSA receptacle and the MUX.

At block 606, the low order mode of a quasi-MM signal and the higher order mode of the quasi-MM signal may be determined. The quasi-MM signal may be an optical signal that is launched to an optical fiber from the TOSA receptacle. Determination of the low order mode and the higher order mode may occur through configuration of a core diameter of the TOSA receptacle and of a receptacle length of the TOSA receptacle. For instance, increasing the receptacle length may attenuate more of the higher order modes, which may also reduce an optical power of the quasi-MM signal. Similarly, increasing the core diameter may increase a number of higher order modes, which may also increase the optical power and signal-to-noise ratio of the quasi-MM signal.

In some embodiments, the determination may occur before construction of a system such as the system 100 implementing the method 600. Additionally or alternatively, the determination may include selection of a particular communication module, a TOSA receptacle, or optical transmitter to include in the system implementing the method 600.

At block 608, the quasi-MM signal may be launched from the TOSA receptacle to an optical fiber. The quasi-MM signal may include a low order mode optical signal and a higher order mode optical signal. At block 610, the quasi-MM signal may be received at a ROSA receptacle of an optical receiver.

At block 612, the higher order mode of the quasi-MM signal may be substantially blocked. In some embodiments, the blocking includes receiving the quasi-MM signal at the ROSA receptacle that includes an SMF fiber stub receptacle that is configured to attenuate the higher order mode prior to reception by a photodetector.

In some embodiments, the blocking the higher order modes includes receiving the quasi-MM signal at the ROSA receptacle that includes an MMF fiber stub receptacle. Additionally, in these and other embodiments, the blocking includes producing an image of an exit of the ROSA receptacle on a photodetector surface. An area of the image may be greater than an active region of the photodetector. For example, the diameter of the active region may be about 30 µm and the diameter of the image may be about 50 µm. Thus, the photodetector does not detect a portion of the image that includes the higher order modes.

In some embodiments, the blocking includes positioning a fiber segment in the receiver. The fiber segment may include a core diameter that is less than a diameter of the ROSA receptacle. The fiber segment may block the portions of the optical signal that includes at least some of the higher order modes such that the higher order modes are not detected by the PDs.

In some embodiments, the blocking the higher order modes includes communicating the quasi-MM signal along one or more SMF that optically couple the ROSA receptacle with the TOSA receptacle.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Combinations of the foregoing embodiments, implementations, and techniques not specifically illustrated might also be provided so as to achieve a desired functionality. The example embodiments disclosed herein may be embodied in other specific forms. The example embodiments disclosed herein are to be considered in all respects only as illustrative and not restrictive.

What is claimed is:

1. A system for communicating an optical signal, the system comprising:
an optical transmitter including one or more lasers configured to produce a light signal and a transmitter optical sub assembly (TOSA) receptacle, wherein the TOSA receptacle optically couples the lasers to an optical fiber and launches a quasi-multimode optical signal (quasi-MM signal) that includes at least one lower order mode optical signal and at least one higher order mode optical signal onto the optical fiber; and
an optical receiver connected to the optical fiber via a receiver optical sub assembly (ROSA) receptacle, wherein the optical receiver is configured to receive the quasi-MM signal and to substantially block the at least one higher order mode optical signal,
wherein the at least one lower order mode optical signal and the at least one higher order mode optical signal included in the quasi-MM signal are at least partially controlled by a receptacle length of the TOSA receptacle and a core diameter of the TOSA receptacle.

2. The system of claim 1, wherein the optical fiber includes a single mode fiber (SMF).

3. The system of claim 1, wherein:
the optical receiver includes one or more photodetectors; and
the ROSA receptacle includes an SMF fiber stub receptacle that is configured to receive the quasi-MM signal and to attenuate the at least one higher order mode optical signal prior to reception by the one or more photodetectors.

4. The system of claim 3, wherein:
the optical receiver includes a demultiplexer that is positioned between the ROSA receptacle and the one or more photodetectors; and
the one or more photodetectors receive light signals from the demultiplexer.

5. The system of claim 1, wherein:
the ROSA receptacle includes a multimode fiber (MMF) fiber stub receptacle; and
the optical receiver includes one or more photodectors with an active region that is small relative to an image of an exit of the MMF fiber stub receptacle.

6. The system of claim 5, further comprising imaging optics positioned above a surface of the photodetector, wherein the imaging optics are configured to produce the image of the exit of the MMF fiber stub receptacle on the active region.

7. The system of claim 6, wherein a diameter of the active region of the photodetector is about 30 micrometers (µm), and a diameter of the image is about 50 µm.

8. The system of claim 5, wherein:
the optical receiver includes one or more imaging optics the one or more imaging optics configured to produce an image on the active regions of the one or more photodetectors;

the optical receiver includes a demultiplexer that is positioned between the ROSA receptacle and the one or more photodetectors; and the one or more imaging optics are positioned between the demultiplexer and the one or more photodetectors.

9. The system of claim 1, wherein:

the optical fiber includes a multimode fiber (MMF); and the TOSA receptacle includes a single mode fiber (SMF) fiber stub receptacle.

10. The system of claim 9, further comprising a coarse wavelength division multiplexer (CWDM MUX) that is coupled to a core and a cladding of the SMF fiber stub receptacle, wherein:

the lasers include a distributed feedback (DFB) laser or a vertical-cavity surface-emitting laser (VCSEL), and the light signals are generated at about 10 gigabits per second (Gbps).

11. The system of claim 10, further comprising a fiber section that is positioned between the CWDM MUX and the TOSA receptacle.

12. A communication module comprising:

two or more lasers configured to produce light signals;

a multiplexer (MUX) configured to receive the light signals and multiplex the light signals into a wavelength division multiplex (WDM) optical signal; and a transmitter optical sub assembly (TOSA) receptacle that launches at least a portion of the WDM optical signal to an optical fiber, wherein:

the TOSA receptacle includes a receptacle length that is configured such that higher order modes of an optical signal received by the TOSA receptacle are not completely attenuated prior to being launched onto the optical fiber, and the higher order modes included in the optical signal are at least partially determined by the receptacle length of the TOSA receptacle and a core diameter of the TOSA receptacle.

13. The communication module of claim 12, wherein the MUX is directly optically coupled to the TOSA receptacle such that the higher order modes of the optical signal and at least one lower order mode optical signal are launched from the TOSA receptacle to the optical fiber.

14. The communication module of claim 13, wherein:

the optical fiber includes a single mode fiber (SMF); and the core diameter of the TOSA receptacle is greater than a core diameter of the SMF.

15. The communication module of claim 12, further comprising a section of SMF positioned between the MUX and the TOSA receptacle, wherein the section of the SMF is configured to receive the WDM optical signal from the MUX, substantially attenuate the higher order modes, and communicate lower order mode optical signals to the TOSA receptacle.

16. A method of increasing modal bandwidth in a communications link, comprising:

producing an optical signal;

optically communicating the optical signal to a transmitter optical sub assembly (TOSA) receptacle;

launching a quasi-multimode optical signal (quasi-MM signal) from the TOSA receptacle to an optical fiber, the quasi-MM signal including a lower order mode optical signal and a higher order mode optical signal and the lower order mode optical signal of the quasi-MM signal and the higher order mode optical signal of the quasi-MM signal are at least partially controlled by a core diameter of the TOSA receptacle and of a receptacle length of the TOSA receptacle;

receiving the quasi-MM signal at a receiver optical sub assembly (ROSA) receptacle of an optical receiver; and substantially blocking the higher order mode of the quasi-MM optical signal.

17. The method of claim 16, wherein the blocking includes receiving the quasi-MM signal at the ROSA receptacle that includes a single mode fiber (SMF) fiber stub receptacle that is configured to attenuate the higher order mode prior to reception by a photodetector.

18. The method of claim 16, wherein the blocking the higher order modes includes:

receiving the quasi-MM signal at the ROSA receptacle that includes a multimode fiber (MMF) fiber stub receptacle; and producing an image of an exit of the ROSA receptacle on a photo-detector surface, wherein an area of the image is greater than an area of an active region of the photo-detector.

19. The method of claim 18, wherein a diameter of the active region is about 30 micrometers μm and the diameter of the image is about 50 μm.

20. The method of claim 16, wherein the blocking the higher order modes includes communicating the quasi-MM signal along one or more SMF that optically couple the ROSA receptacle with the TOSA receptacle.

* * * * *